(No Model.) 2 Sheets—Sheet 1.

L. ERPELDING.
HARVESTER RAKE.

No. 246,299. Patented Aug. 30, 1881.

Attest:
William W. Dodge.
Danl. Kelly.

Inventor:
Lambert Erpelding
By Ranniger & Simanson
Attorneys.

(No Model.) 2 Sheets—Sheet 2.

L. ERPELDING.
HARVESTER RAKE.

No. 246,299. Patented Aug. 30, 1881.

Witnesses:
William W. Dodge.
Danl. Kelly.

Inventor:
Lambert Erpelding
By Parkinson & Parkinson
Attorneys.

UNITED STATES PATENT OFFICE.

LAMBERT ERPELDING, OF CHICAGO, ILLINOIS, ASSIGNOR TO THE McCORMICK HARVESTING MACHINE COMPANY, OF SAME PLACE.

HARVESTER-RAKE.

SPECIFICATION forming part of Letters Patent No. 246,299, dated August 30, 1881.

Application filed April 15, 1881. (No model.)

*To all whom it may concern:*

Be it known that I, LAMBERT ERPELDING, of Chicago, in the county of Cook and State of Illinois, have invented new and useful Improvements in Harvester-Rakes, of which the following is a specification.

My invention relates to that class of sweep-rakes controlled by a double-track cam and a switch which changes the path of the rollers of the rake-arms from one track to the other, to cause the periodical descent of one or more of the arms for the purpose of sweeping the platform.

In the practical use of reapers it is desirable, on account of the varying growth of grain at different points, to regulate and vary the periods during which grain is allowed to accumulate upon the platform of the machine. For this purpose I provide such means for controlling the switch that the descent of the rake arm or arms is ordinarily caused to take place automatically at stated intervals, but at the will of the driver or attendant may be caused in advance of the automatic action or the interval prolonged, and the descent of the rake-arm prevented until a sufficient quantity of grain is collected, or a convenient place for the discharge of the grain is reached; and my improvements therefore consist in a peculiar construction and arrangement of parts whereby the switch is operated automatically under ordinary circumstances, and at other times intentionally operated or held out of operation by the attendant; and in the various combinations and details hereinafter described and claimed.

Figure 1:
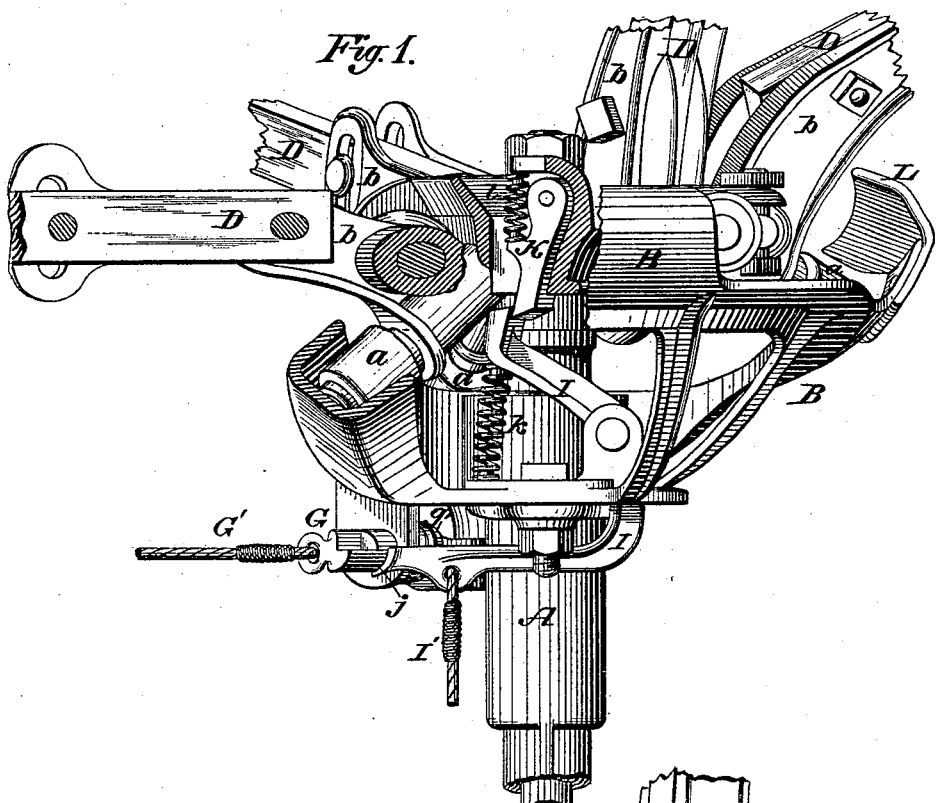
Figure 2:
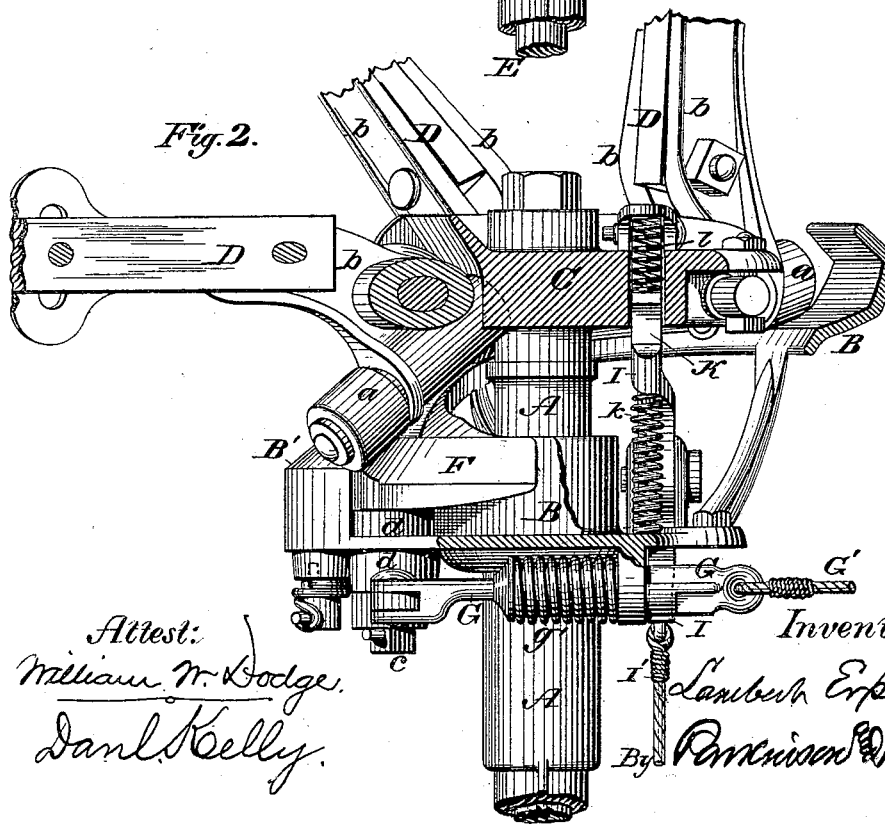
Figure 3:
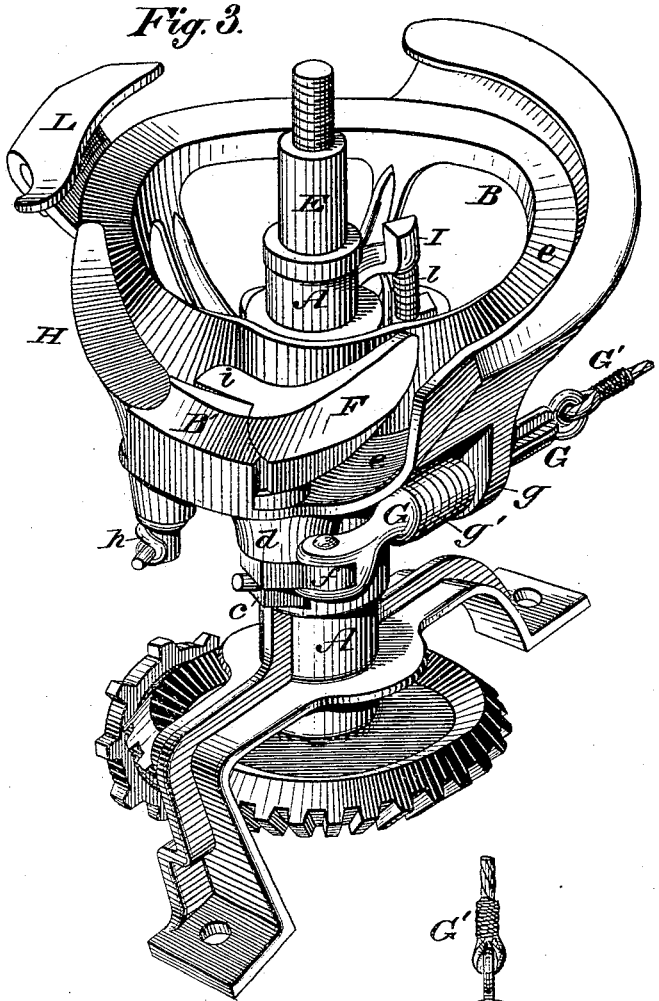
Figure 4:
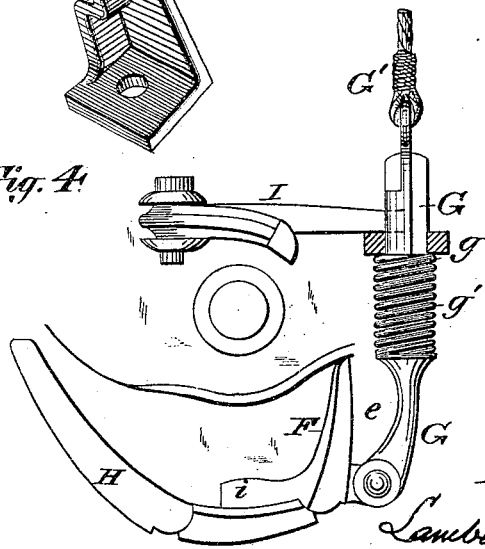

In the accompanying drawings, Figure 1 represents a side elevation of a reel or rake standard and rake-head, partially broken away to show the arrangement of parts; Fig. 2, a similar view taken at right angles, or substantially so, to the first; Fig. 3, a perspective view of the standard, showing more clearly the form of the cam; Fig. 4, a diagram or plan showing the relative positions of the switch and its controlling devices.

The mechanism is composed of a revolving rake or reel head, a double-track cam, a switch having an arm secured to its shaft or arbor, a sliding bolt connected with said arm and urged forward by a spring which tends to hold the switch outward, opening the inner passage or track and closing the outer, a latch or trip engaging with said bolt, and serving to retain the same in a retracted position against the stress of the spring, and a dog or pawl attached to the revolving rake-head, and serving to operate the latch or trip.

The latch and the bolt are both provided with cords—the former for releasing the latch at any time and allowing the switch to swing outward and open the inner passage, and the latter for the purpose of retracting the bolt, closing said passage, and opening the outer one when desired.

In the drawings, A represents the rake or reel standard, having at its upper end the cam B, by which the gradual rise and fall of the rake-arms is effected; and C, the revolving rake-head, having the rake-arms D pivoted therein, and provided with rollers *a*, to travel over the cam-track and effect the elevation and lowering of the arms.

The rake-head is mounted and secured, as usual, upon a vertical shaft or spindle, E, passing centrally through the standard, and is caused to rotate in a horizontal plane by means of gearing at the lower end of said spindle. The rake-arms are bolted or secured between straps or castings *b*, pivoted in the rake-head, and provided with rollers *a*, which travel over the cam-track, as above mentioned.

F represents the switch, located, as shown in Fig. 3, at the lower side of the cam, and provided with a spindle or arbor, *c*, passing vertically through a neck, *d*, formed upon the cam-head or frame, the switch being arranged to open either track or passage of the cam-head and close the other, according to the direction in which it is turned. The lower end of the spindle or arbor *c* is squared, and upon the squared end is secured an arm, *f*, the outer end of which is jointed to a bolt, G, sliding longitudinally through a lug or ear, *g*, formed upon the cam-head or frame, said bolt being urged forward by a spring, *g'*, which tends to hold the switch in its open or outward position. The rear end of the bolt is formed with an eye for the attachment of a cord or rod, G', by which it may be at any time withdrawn against the force of the spring by the driver or attendant, for the purpose of moving the switch inward to the position shown in Fig. 3, thereby closing the inner track or passage and opening the outer. When the switch is closed or thrown inward the rollers a will be caused to travel upon the outer face of the switch, along the raised portion B' of the cam head or frame, and over a bridge, H, back to the cam B, the track thus formed preventing the descent of the rake-arms to the grain-platform, but causing them to act in the capacity of reel-beaters, to present the grain properly to the cutter. When, however, the switch is opened outward, closing the passage or opening e, the roller a of the first arm reaching said switch will be caused to travel inside of or behind the same and behind the raised portion B' directly upon the cam B, pushing back the bridge in advance, and allowing the rake to sweep the platform. The bridge is held normally in the position indicated in Fig. 3 by a spring, h, acting upon its arbor or spindle, as shown.

It will be observed that the switch is formed with a tail or heel, i, which is thrown across the inner track or passage when the switch is opened or moved outward. Being thus placed directly in the path of the roller of the rake-arm, the tail is pressed back before the roller, and the switch is thereby thrown inward against the pressure of spring g', to close the inner track or passage and cause the succeeding rake-arms to travel over the outer track and clear of the platform.

For the purpose of retaining the bolt in its retracted position, whether withdrawn by the attendant or thrown back automatically by the roller of a rake-arm, I employ a latch or trip, I, which, as more clearly indicated in Fig. 1, consists of a bent arm pivoted in the frame or standard A, and of such form and size that its upper end reaches close to the lower face of the rake-head, while its lower end extends forward and engages in a seat or notch, j, in the lower side of the switch-bolt G. The latch or trip is urged upward by a spring, k, (which in the present instance is represented as placed beneath the upper arm, but which may be arranged in any equivalent or convenient manner,) and is limited in its upward movement by the contact or engagement of its lower arm with the bolt. When the bolt is retracted, either automatically or intentionally, as above explained, the latch, urged upward by its spring, engages in the notch or recess therein, and holds it in its retracted position until again unlatched and disengaged therefrom by the action of the machine or attendant. In order that this disengagement may be effected at any moment, the latch or trip is formed with an eye for the attachment of a cord or rod, I', by which the driver or attendant may instantly and at any time withdraw the latch. Ordinarily, however, where there is an average and uniform growth of grain, it is desirable that the operation of the switch shall be automatic and the driver or attendant relieved of such duty. Hence the rake-head is furnished with a dog or pawl, K, which once in each revolution of the rake-head engages with and releases the latch or trip. This dog or pawl is shown in Figs. 1 and 2, and consists of a pendulous bolt or stem hung from a pivot in a recess in the revolving rake-head, the back of which recess forms a stop or support to prevent the backward movement of the dog. The bolt or dog is urged against said support by a spring, l, as shown, but may, by overcoming the pressure of the spring, swing forward to prevent the tripping of the switch or injury to the parts in case the rake-head is reversely rotated. The location of the dog or pawl is such that in being carried around with the rake-head it engages with the upper end of the trip or latch, carrying the same forward and downward and causing the disengagement of its lower end from the switch-bolt. As soon as the dog or pawl passes the latch the latter is raised by its spring, and upon the retraction of the bolt through the action of the roller of the rake-arm or otherwise enters the recess thereof and locks it in its retracted position, closing the inner track or passage of the cam and causing the rake-arms to pass over the outer track until the dog again trips the latch and allows an arm to fall and again sweep the platform.

Should it be desired to prolong the period during which grain is allowed to accumulate upon the platform, the switch-bolt may be held back by the driver or attendant drawing upon the cord or rod G', and thus preventing the spring g from carrying the bolt forward and shifting the switch when the dog or pawl trips the latch.

Under the above construction it will be seen the action of the rake and the periods of accumulation may be perfectly controlled by the driver or attendant.

It is found in practice that by reason of the sudden elevation of the rake-arms in passing from the lower to the upper portion of the track or cam the rollers thereof are sometimes lifted from the track and the arms allowed to rise too high, the action tending also to wrench and loosen the parts of the machine. To obviate this difficulty I provide a guard, L, locating the same over that portion of the cam or track where such action is found to take place, or, in other words, over that portion extending from the upper end of the bridge to the upper plane of the cam, as shown in Figs. 1 and 3. This guard insures a steady and regular movement of the rake-arms, and is found greatly to improve the action of the rake.

I claim—

1. In a sweep-rake, the combination of a cam having an inside and an outside track, a switch adapted to simultaneously open one track and close the other, a latch adapted to retain the switch in one position, and a dog or pawl adapted to trip said latch when moving forward, but to ride over the same in moving backward, as and for the purpose set forth.

2. In a sweep-rake, the combination of a cam having an inner and an outer track, a switch adapted to open one track and to close the other, a bolt connected with the switch and urged forward by a spring to throw the switch outward and open the inner track, and a latch engaging with said bolt when retracted to retain the switch in its inward or closed position.

3. In a sweep-rake, the combination of a rake-head, a cam having an inner and an outer track, a switch adapted to open one track and close the other, a bolt connected with the switch and urged forward by a spring to throw the switch outward and open the inner track, a latch engaging with said bolt when the latter is retracted and the switch is swung inward, and a dog or pawl mounted in the rake-head and adapted to trip the latch.

4. In a sweep-rake substantially such as described, a switch adapted to vary the path of the rake-arms, a locking device adapted to retain the switch in one position, and a pawl or dog adapted and arranged to release the locking device when the rake-head moves in its operative direction, but to ride over the same without acting thereon when the movement is reversed.

5. In a sweep-rake, the combination of a cam having two tracks, a switch adapted to open one track and close the other, a bolt connected with the switch and urged forward by a spring to move the switch to its outward position, and provided with a retracting cord or rod, and a latch, also provided with a retracting cord or rod and normally pressed forward to lock the bolt in its retracted position.

6. In a sweep-rake, the combination of a cam having two tracks, a switch adapted to open one track and close the other, a bolt connected with the switch and urged forward by a spring to move the switch to its outward position, and provided with a retracting cord or rod, a latch, also provided with a retracting cord or rod and adapted to lock the bolt in its retracted position, and a rake-head provided with a dog or pawl to trip the latch, as set forth.

7. The combination, with the switch and its cranked pivot-spindle, of the sliding rod or bolt G and the spring coiled around said rod and urging it endwise, as and for the purpose set forth.

8. In a sweep-rake, the combination of the cam B, switch F, bolt G, provided with a spring, latch I, and rake-head C, provided with dog K, substantially as described.

9. In a sweep-rake, the combination of the cam B, switch F, bolt G, provided with a spring, $g$, and with an operating cord or rod, latch I, and rake-head C, provided with pawl K, substantially as described.

10. In a sweep-rake, the combination of cam B, switch F, bolt G, provided with a spring, latch I, provided with an operating cord or rod, and rake-head C, carrying a pawl or dog, K, substantially as described.

11. The dog pivoted in the rake-head and held in one direction by a positive stop, while free to yield in the other against the stress of a spring.

12. In combination with the cam B and its bridge H, and with the revolving rake-head and its arms, the guard L, placed over the free end of the bridge, as and for the purpose set forth.

LAMBERT ERPELDING.

Witnesses:
   JOHN V. A. HASBROOK,
   JOHN BIRKHOLZ.